May 23, 1967  F. BARTU ETAL  3,321,301
PROCESS OF REFINING IRON AND HEARTH FURNACE
FOR CARRYING OUT THIS PROCESS
Filed June 30, 1964  2 Sheets-Sheet 1
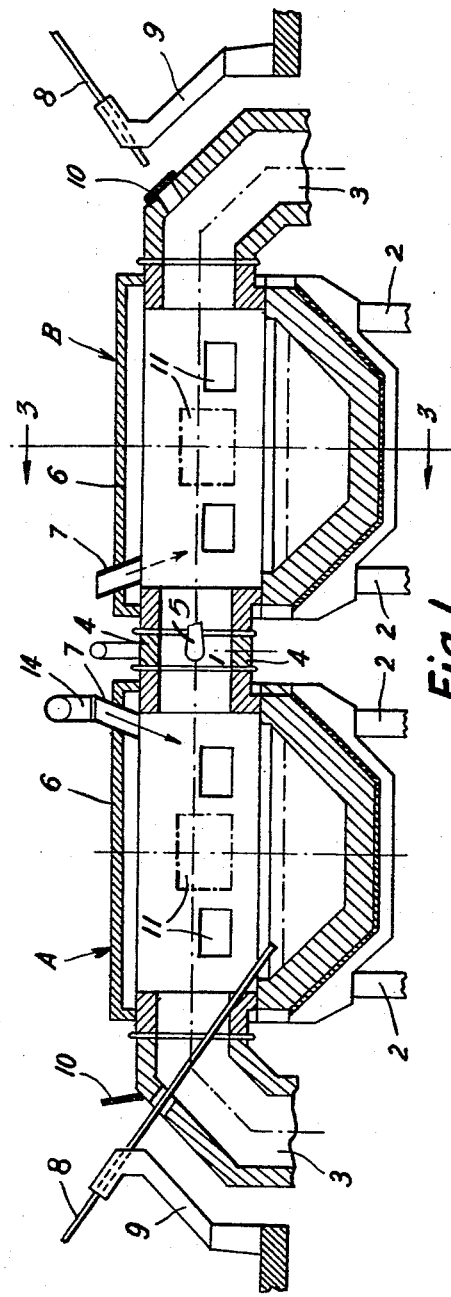
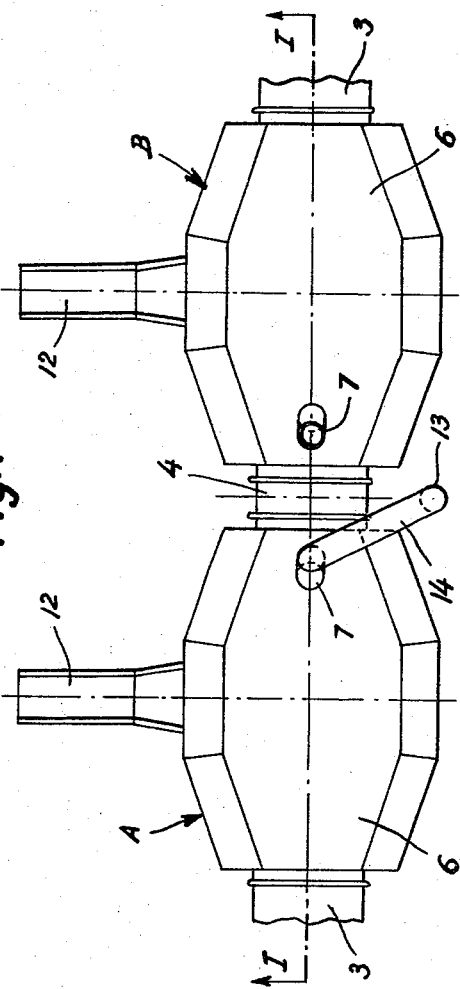
INVENTORS
Franz Bartu
Alfred Stesaczek
BY
ATTORNEYS

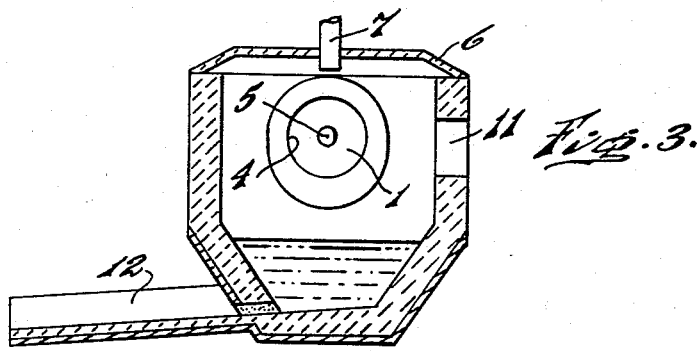
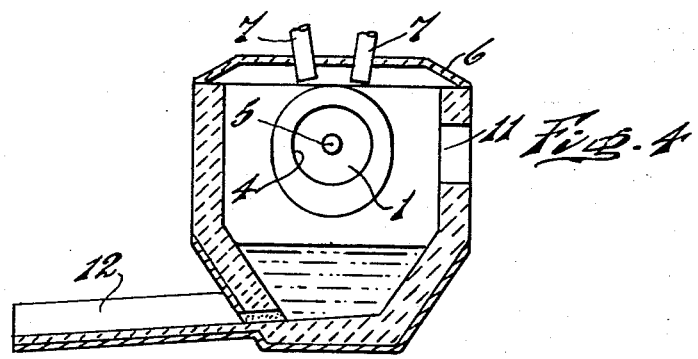
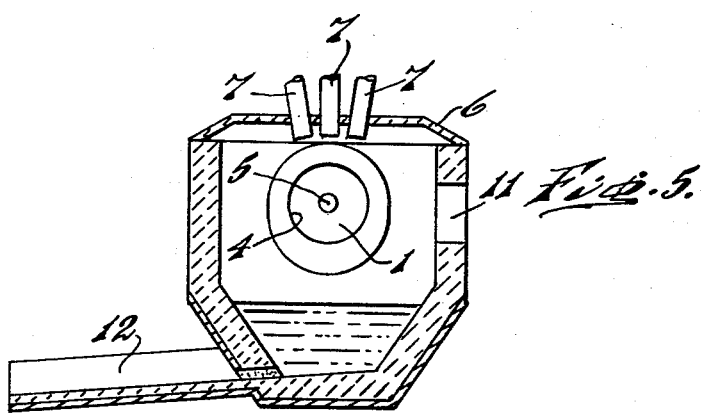

United States Patent Office
3,321,301
Patented May 23, 1967

3,321,301
PROCESS OF REFINING IRON AND HEARTH FURNACE FOR CARRYING OUT THIS PROCESS
Franz Bartu and Alfred Slesaczek, Kusnacht-Zurich, Switzerland, assignors to Maerz Ofenbau AG, a corporation
Filed June 30, 1964, Ser. No. 379,283
Claims priority, application Austria, July 22, 1963, A 5,826/63; May 15, 1964, A 4,267/64
8 Claims. (Cl. 75—60)

This invention relates to a process of refining iron with oxygen and/or air, and a hearth furnace for carrying out this process.

More recently, several processes of making steel have been disclosed, in which iron is refined with oxygen or oxygen-enriched air in a hearth furnace, which consists of two hearths, which are connected in series by a transfer duct. The two hearths may be formed by stationary or tiltable hearth furnaces or rotary furnaces. In these known processes, the two hearths are operated in alternation and the hot, carbon monoxide-containing exhaust gases produced by refining in one hearth are conducted into the second hearth, in which they are burnt with oxygen or oxygen-enriched air so that the charge introduced into the second hearth is preheated or molten.

In all these known processes, the transfer of the combustible, carbon monoxide-containing waste gases from the hearth which is refining, into the hearth which is preheating, is effected with the aid of the chimney draft, and the combustible exhaust gases are burnt in the preheating hearth by the introduction of a combustion-supporting agent, which consists of oxygen and/or air. For this purpose, a nozzle for supplying the combustion-supporting agent is provided in the transfer duct itself, or one longitudinal row or a plurality of longitudinal rows of such nozzles are provided in the roof of the second hearth chamber, and the oxygen and/or air is blown from a small height above the bath or charge onto the bath surface at right angles or at an inclination. With this arrangement of the nozzles for the combustion-supporting agent, satisfactory flames cannot be obtained because the combustible gas must be virtually sucked by the oxygen and/or air jet when a proper combustion and also a good utilization of the combustion-supporting agent is to be ensured. The larger the distance of such nozzles from the transfer duct, the larger will be the amount of flue gas which is sucked together with the combustible gas, because the atmosphere in the regions from which the nozzles suck gas consists at the beginning of the hearth mainly of combustible gas but is increasingly diluted by flue gas formed as the distance from the beginning of the hearth increases. It may be mentioned, e.g., that with an arrangement of ten nozzles spaced in the longitudinal direction of the furnace, the region from which the last nozzle is sucking will contain a mixture of about 10% combustible gas and 90% flue gas. Such an arrangement would result in an incomplete combustion of the combustible gas and in a considerable reduction of the flame temperature and of the heat transfer to the charge to be preheated.

The invention is based on the recognition that a good heating of the charge to be preheated can be achieved in the above-mentioned processes of known type if a directed flame is used, as in an open-hearth furnace, which flame is considerably developed already at the beginning of the hearth, i.e. the inlet end of the hearth. It is particularly desirable if, according to a proposal which does not yet belong to the state of the art, an entraining nozzle is used for transferring the carbon monoxide-containing exhaust gases from the hearth which is refining into the other hearth, which nozzle is disposed in the transfer duct and extends preferably horizontally and has an outlet disposed in the axial direction of this duct, said nozzle being operated with an entraining gas, such as cold or preheated air, steam, or a fuel gas, such as pressurized natural gas. Hence, the invention relates to a process of refining iron with oxygen and/or air in a hearth furnace consisting of two hearths connected in series by a transfer duct, in which process the carbon monoxide-containing exhaust gases produced by refining in the one hearth are sucked from the hearth which is refining and introduced into the other hearth, preferably with the aid of an entraining nozzle arranged in the transfer duct, and are burnt in said other hearth with the aid of oxygen and/or air as a combustion-supporting agent. The essential feature of this process resides in that at least one nozzle which opens into the hearth chamber outside the transfer duct and slightly above or in the upper portion of the stream of the carbon monoxide-containing exhaust gases is used for supplying the combustion-supporting agent and serves to produce a directed flame, which is considerably developed at the inlet end of the hearth, beside the transfer duct, and is directed with an inclination to the bath surface. This nozzle is disposed above the stream of the exhaust gases or combustible gases in the end wall or in the roof in such a manner that it opens directly above the gas stream or the outlet of the nozzle is only slightly immersed in said stream. The nozzle may be disposed within the transfer duct, if desired, if an imaginary extension of its outlet extends into the hearth chamber. In other words, the transfer duct between the two hearths is used according to the invention like a gas flue of an open-hearth furnace and the oxygen or air or an oxygen-air mixture in the amount required for combustion is blown with an inclination onto or into the gas stream which is introduced by the transfer duct into the hearth which is preheating.

The diameter of the transfer duct must be designed in accordance with the maximum rate of gas to be transferred. In tiltable hearths, a certain minimum length of the transfer duct is determined by the design because the tiltable hearths must be mutually independently reinforced so that the duct must have at least the length which corresponds to the space required for accommodating the reinforcement. Two further sections of the transfer duct must correspond to the thickness of the masonry of the mutually facing end walls of the hearths.

The transfer duct should be disposed as high as possible over the bath in order to minimize the entraining of dust or slag and avoid stoppages due to clogging. Owing to the high position of the transfer duct, the stream of the exhaust gases which are to be burnt enters the hearth chamber on a high level above the bath and must be forced or sucked down onto the bath by the oxygen and/or air supplied as a combustion-supporting agent by the nozzle or nozzles in such a manner that the flame impinges on the bath surface as closely as possible to the beginning of the hearth chamber. It will thus be appreciated that in the hearth furnace according to the invention, which furnace consists of two hearths, which are connected in series by a transfer duct, in which an entraining nozzle is preferably disposed, and which furnace is characterized in that at least one nozzle for supplying the combustion-supporting agent is provided in each hearth and is disposed in the end wall or in the roof and opens into the hearth chamber above and outside the transfer duct, the inclination of the nozzles to the bath surface is of great significance. Investigations have shown that the nozzles should be inclined to the bath surface of the hearth from above at a steep angle, preferably between 40° and 60°, e.g., 50°. In each hearth, two or more nozzles may be arranged in a row at right angles to the longitudinal axis of the hearth and may open into that portion of the hearth chamber which adjoins the transfer duct. Two rows of nozzles may be arranged at right angles to the longitudinal axis of the hearth, if desired, and may open into that portion of the hearth chamber which adjoins the transfer duct.

The essential feature of the nozzle arrangement resides in that it enables the combustion-supporting agent to determine the direction of the flame in such a manner that the flame is developed at the inlet end of the hearth, after the transfer duct, and is inclined against the bath surface. If the direction of the flame were determined by the direction of flow of the combustible, monoxide-containing exhaust gases, the latter would flow over the charge of the hearth and would not satisfactorily heat the same because of their non-luminous flame. Further the high position of the flame would result in a great wear of the roof and of the upper portion of the walls of the hearth chamber. For these reasons, the directed flame ensured by the invention is not only significant from the aspect of the heat transfer to the charge but also from the viewpoint of the life of the hearth. In general, the following remarks may be made:

The jet of the combustion-supporting agent discharged by the nozzle should suck only the combustible, carbon monoxide-containing exhaust gases coming from the refining hearth but should not suck flue gases as far as this can be avoided. This object will be accomplished most reliably if the jet of the combustion-supporting agent extends and passes through the stream of the exhaust gases. In this case, even a small impulse of the jet of the combustion-supporting agent will be sufficient, particularly because the steep angle between the stream of the combustion-supporting agent and the stream of the exhaust gases will result in an additional mixing action. On the other hand, if the nozzle for supplying the combustion-supporting agent opened in the interior or in the central portion of the exhaust gas stream, the jet of the combustion-supporting agent would require a very high impulse to be able to suck the entire amount of the exhaust gases. If the nozzle were arranged to suck flue gases in addition to the combustible, carbon monoxide-containing exhaust gases, the suction effect and with it the impulse of the jet of the combustion-supporting agent would also have to be higher. In this case, the also sucked flue gases would lower the flame temperature and at the same time a highly undesirable backdrift of the flue gases in the hearth chamber would result because the nozzle would be continually sucking flue gas. With a high impulse of the jet of the combustion-supporting agent and a resulting high impulse of the flame, a strong local superheating of the charge would ensue so that the scrap would not be heated as uniformly as possible but holes would be fused into the pile of scrap, as in an electric arc furnace, and relatively large amounts of iron could be burnt and evaporated. If the flame is produced with the aid of a nozzle arranged according to the invention, a softer flame will be obtained, which ensures a uniform heating of the charge.

Particularly favorable results will be obtained if two nozzles are used in the process or hearth furnace according to the invention and these nozzles are arranged in a row at right angles to the longitudinal axis of the hearth in such a manner that their converging axes include an acute angle, preferably an angle of at least 8°.

It may be mentioned here that the stream of oxygen and/or air from a single nozzle will suck gaseous fluid from the environment so that the jet will have a certain angle of dispersion, which is about 16–20°. If this stream or the respective flame impinges on the surface of the charge to be preheated, the stream or flame will be deflected and spread further. Owing to this spread, the outer generatrices or stream threads will be strongly directed toward the walls, and overflow flame will rise on the walls. This is undesirable because it results in a greater wear of the masonry. Two nozzles converging at a suitable angle will produce two flames, and each of these flames will have a cone angle of about 16–20°. In this case, however, the position of the two nozzles may be adjusted in a desired manner, e.g., so that the outer generatrices of the flames are parallel. The outer generatrices of such a flame, which may be described as a double flame, are not directed toward the walls and the spreading of the flame as it impinges on the charge to be preheated is much smaller than in the case of a flame from only one nozzle. If the angle included by the axes of the two nozzles is selected to be as large as the cone angle of the jet or stream of oxygen and/or air from a single nozzle, the outer generatrices of the two flame cones produced by the two nozzles will be parallel. Such a parallelism will be obtained with an angle of about 16–20° between the axes of the two nozzles.

A third nozzle may be arranged between the two nozzles, if desired, the jet from which third nozzle lies in the axis of symmetry of the jets from these two nozzles. In all cases, however, the nozzles should be inclined at an angle of about 40–60° to the bath surface.

The invention will be explained more fully with reference to an illustrative embodiment of a hearth furnace shown in the drawing, in which FIG. 1 is a longitudinal sectional view taken on line 1—1 of FIG. 2 and showing this hearth furnace, FIG. 2 is a top plan view showing this hearth furnace, FIG. 3 is a transverse section on the line 3—3 of FIG. 1 showing a single nozzle in the roof, FIG. 4 is a modification of FIG. 3 employing two nozzles in the roof and FIG. 5 is a modification of FIG. 3 in which there are three nozzles in the roof.

The illustrated hearth furnace consists of two hearths A and B, which are connected in series by a transfer duct 1. The hearths A and B rest on supports 2. In the case of tiltable hearths, these supports consist of rockers, which rest on roller tables. Ducts 3 for discharging the exhaust gases are connected to the ends of the two hearths A and B.

The intermediate part 4 of the hearth furnace may incorporate, if desired, an entraining nozzle 5, which is coaxial with the transfer duct 1 and serves for introducing the carbon monoxide-containing exhaust gases with the aid of an entraining gas from the hearth which is refining through the transfer duct 1 into the hearth which is preheating. For this reason, this entraining nozzle 5 will always be directed against that hearth in which the exhaust gases produced by refining in the other hearth are burnt. The entraining gas flowing in through the entraining nozzle 5 produces a suction, which ensures a good withdrawal of the carbon monoxide-containing exhaust gases from the hearth which is refining.

At least one nozzle 7 (FIG. 3) enters through the roof 6 of each hearth A or B and opens into the hearth chamber outside of the transfer duct 1 and above the exhaust gas stream flowing through this duct. This nozzle or nozzles 7 are inclined to the surface of the bath level of the hearth at a steep angle, which in the illustrated example amounts to about 60°. The nozzle or nozzles might even be immersed to some extent into the exhaust gas stream; they might alternatively be disposed in the end wall or, if desired, within the transfer duct, provided that at the selected inclination the imaginary extension of their outlet axis lies in the hearth chamber.

The two hearths A and B are suitably provided with lances 8 for blowing oxygen for refining. The lances 8 are mounted in stationary brackets 9 and may be extended from these brackets into the hearths through openings formed in the walls of the end ducts 3 of the hearths A and B, which openings can be closed by covers 10.

The hearths are provided in the usual manner with operating openings 11. The intermediate one of these openings which lies in the front wall serves as charging opening, and the two other openings lying in the back wall serve for repairs. Tiltable hearths are provided with tapping troughs 12.

The nozzles 7 which in the example shown enter through the roofs 6 of the hearths A and B are supplied with air and/or oxygen through a conduit pipe 13, which can be selectively connected to either of the two nozzles 7, e.g., by means of a pivotally movable pipe 14. It will be understood that each nozzle 7 may be provided with a separate supply pipe.

FIG. 4 shows a variation of the furnace of the invention in which the preheating hearth utilizes two nozzles 7 in the roof angularly converging toward one another.

FIG. 5 is a modification of the furnace of the invention in which the preheating furnace utilizes three nozzles 7, the outer two of which are converging toward one another.

What is claimed is:

1. A process of producing refined iron, which comprises contacting a first quantity of iron in the form of a melt at a refining temperature in a first hearth with an oxidizing gas to refine said first quantity of iron and produce carbon monoxide-containing exhaust gases, providing a second quantity of iron at a temperature below said refining temperature in a second hearth, which is connected by a transfer duct to said first hearth, sucking exhaust gases from said first hearth through said duct and introducing said exhaust gases into said second hearth to form a stream of carbon monoxide-containing exhaust gases in said second hearth, admitting to said stream a combustion-supporting agent in at least one jet from at least one nozzle, burning said exhaust gases with the aid of said combustion-supporting agent, and passing said burned exhaust gases out through a gas outlet, in which process said at least one jet is formed by said at least one nozzle positioned in the roof of said second hearth and opening into said second hearth outside, adjacent to and above said transfer duct at the inlet end of said second hearth, with an inclination to the bath surface of said second hearth, and said at least one nozzle being the nearest to the gas outlet of any nozzle positioned in the roof of said second hearth.

2. A hearth furnace consisting of two hearths, one a refining hearth and the other a preheating hearth at a given time, a transfer duct connecting the hearths in series, a gas outlet for each hearth at the opposite end from the transfer duct, at least one nozzle in each hearth for admitting a combustion-supporting agent to each hearth, said at least one nozzle being positioned in the roof of each of the hearths, opening within the hearth outside, adjacent to and above said transfer duct at the inlet end of each said hearth, with an inclination to the bath surface of each of said hearths, said at least one nozzle being the nearest to the gas outlet of any nozzle positioned in the roof of each of said hearths.

3. A hearth furnace as set forth in claim 2, having in said transfer duct an entraining nozzle, operated with an entraining gas, and operable to transfer exhaust gases from one of said two hearths into the other of said two hearths, said entraining nozzle extending horizontally and having its outlet in the axial direction of said transfer duct.

4. A hearth furnace as set forth in claim 2, having in each of said hearths at least two said nozzles, each positioned longitudinally of the hearth in the position for said at least one nozzle, for admitting said combustion-supporting agent, which two nozzles extend through the roof of said hearths spaced apart at right angles to the axial direction of said transfer duct and said two nozzles having axes converging at an acute angle.

5. A hearth furnace as set forth in claim 4, in which said acute angle is at least 8°.

6. A hearth furnace as set forth in claim 4, in which said axes converge at an angle of about 16 to 20°.

7. A hearth furnace as set forth in claim 4, having in each of said hearths a third said nozzle disposed between said two nozzles, each of said three nozzles being positioned longitudinally of the hearth in the position for said at least one nozzle and adapted to produce a jet of combustion-supporting agent, the jet from the said third nozzle extending in the axis of symmetry of the jets from said two nozzles.

8. A hearth furnace as set forth in claim 2, wherein said at least one nozzle is inclined to the horizontal at an angle of 40 to 60°.

References Cited by the Examiner
UNITED STATES PATENTS 2,940,744  6/1960  Swenson.
3,060,014  10/1962  Aihara _____ 75—60
3,248,211  4/1966  Klein et al. _____ 75—60

BENJAMIN HENKIN, *Primary Examiner.*